US007867590B2

(12) United States Patent
Bernhard et al.

(10) Patent No.: US 7,867,590 B2
(45) **Date of Patent: *Jan. 11, 2011**

(54) SIGNALING BLANK LABEL

(75) Inventors: Richard A. Bernhard, Norwalk, CT (US); Judith D. Auslander, Westport, CT (US); Donald G. Mackay, Roxbury, CT (US); Jay Reichelsheimer, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1670 days.

This patent is subject to a terminal disclaimer.

(21) Appl. No.: 10/873,887

(22) Filed: Jun. 22, 2004

(65) Prior Publication Data

US 2005/0280686 A1 Dec. 22, 2005

(51) Int. Cl.

| | |
|---|---|
| ***B32B 9/00*** | (2006.01) |
| ***B32B 33/00*** | (2006.01) |
| ***G09F 3/10*** | (2006.01) |
| ***G09F 3/00*** | (2006.01) |
| ***B42D 15/00*** | (2006.01) |

(52) U.S. Cl. .................... 428/40.1; 428/41.6; 428/41.7; 428/42.1; 283/71; 283/72; 40/638

(58) Field of Classification Search ............... 428/40.1, 428/41.6, 41.7, 42.1, 915–917; 283/71, 72, 283/80, 901; 40/638
See application file for complete search history.

(56) References Cited

U.S. PATENT DOCUMENTS

| | | | | |
|---|---|---|---|---|
| 5,685,570 | A * | 11/1997 | Gray et al. | 283/71 |
| 6,136,752 | A * | 10/2000 | Paz-Pujalt et al. | 503/227 |
| 6,596,358 | B1 * | 7/2003 | Sakamoto et al. | 428/40.1 |
| 2002/0195586 | A1 | 12/2002 | Auslander et al. | |
| 2003/0005303 | A1 | 1/2003 | Auslander et al. | |
| 2003/0041774 | A1 | 3/2003 | Auslander et al. | |

* cited by examiner

*Primary Examiner*—Patricia L Nordmeyer
(74) *Attorney, Agent, or Firm*—Angelo N. Chaclas; Steven J. Shapiro

(57) ABSTRACT

A label including a main section forming a blank label section and including a fluorescent signal section on the blank label section. The label is adapted to have an indicium subsequently printed on the blank label section by a printing device without the fluorescent signal section substantially interfering with reading of the indicium on the label.

19 Claims, 4 Drawing Sheets

SIGNALING BLANK LABEL

BACKGROUND OF THE INVENTION

1. Field of the Invention

The present invention relates to a label and, more particularly, to a blank label having a luminescent signaling section which an indicium can be subsequently printed on.

2. Brief Description of Prior Developments

Invisible ink jet inks are described in U.S. patent application Ser. No. 10/331,829 filed Dec. 30, 2002 which is hereby incorporated by reference in its entirety. Color fluorescent inks are described in U.S. patent application publication Nos. US 2002/0195586 A1, US 2003/000530s A1, and US 2003/0041774 A1, which are hereby incorporated by reference in their entireties. Color luminescent ink, such as a fluorescent ink or a phosphorescent ink is described in U.S. patent application Ser. No. 10/692,569 filed Oct. 24, 2003, which is hereby incorporated by reference in its entirety. U.S. patent application Ser. No. 10/692,570, filed Oct. 24, 2003, which is hereby incorporated by reference in its entirety, describes halftone printing and gray scale printing with multi-signal transmission ink.

Processing mail with automated equipment at mail processing centers requires correctly orienting the mail so that address information and other related information can be scanned and read. This is accomplished with facing equipment. Currently, stamps can provide a phosphorescent signal. When the facing equipment detects the phosphorescent signal from a stamp, the stamp can be cancelled so that it cannot be used again. This can be done by printing a black mark across the image of the stamp.

Indicia printed by postage meters can provide a fluorescent signature with a special fluorescent ink, or a special barcode known as a FIM (facing and identification mark), to provide the means for properly identifying the front of the mail piece. However, these methods limit what can be printed or can significantly affect the final appearance of the image. Using a FIM requires printing a large barcode in the middle of the image. This FIM provides evidence of postage printing. However, a FIM imposes significant restrictions on what can be printed and its final appearance. The requirement for using fluorescent ink also significantly restricts what can be printed, how it is printed, and the final appearance of the image.

SUMMARY OF THE INVENTION

This invention describes a label comprising a main section forming a blank label section and a fluorescent signal section on the blank label section. The label is adapted to have an indicium subsequently printed on the blank label section by a printing device without the fluorescent signal section substantially interfering with reading of the indicium on the label. The label can comprise a postage meter label which is adapted to have a postage indicium printed on the label. The fluorescent signal section can comprise invisible fluorescent ink or visible fluorescent ink. The fluorescent material can be pre-coated on the label or pre-printed on the label before the label is used with the postage meter to act as a lubricant and water-protective layer. An advantage of this invention is that there is no need for a FIM. This results in saving time and money in the final design of a mailing system.

DETAILED DESCRIPTION OF THE PREFERRED EMBODIMENTS

Figure 1:
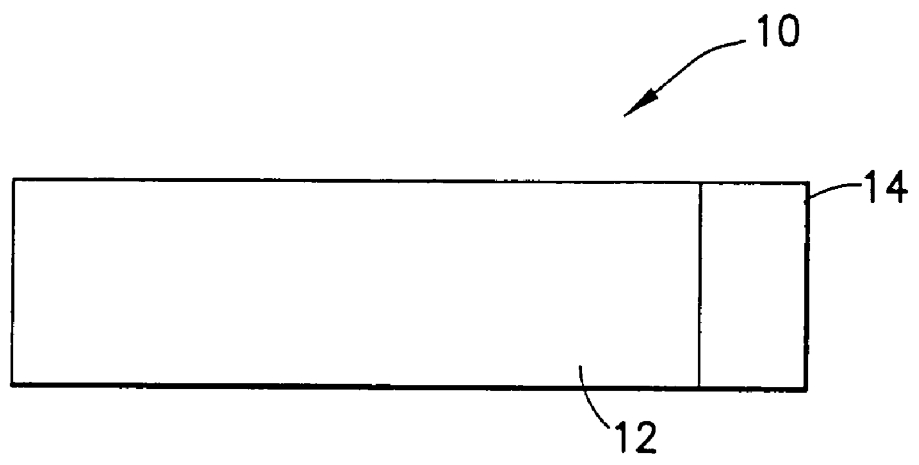
FIG. 1 is a generalized side view of a blank label incorporating features of the present invention.

Referring to FIG. 1, there is shown a schematic side view of a blank label 10 incorporating features of the present invention. As used herein, the term "blank label" is intended to mean a label having an area which is intended to be printed on, such as by an ink printing device, or a thermal printing device if the label is a thermal label, to form a printed indicium label. There may be a pre-formed image or a pre-printed image on the blank label before the printed indicium is added, but the blank label will still have an area which will be available to print the printed indicium thereat which will be able to be read in addition to the pre-formed image(s) or pre-printed images(s), similar to a blank form.

The label 10 generally comprises a main section 12 and a signal section 14. The main section comprises a paper substrate or polypropylene substrate like Mitsubishi K61S-cc direct thermal media. The signal section 14 comprises a coating on the main section 12. The coating 14 comprises a taggant material, such as a luminescent material. The luminescent material could comprise a fluorescent material or a phosphorescent material. In a preferred embodiment, the luminescent material comprises fluorescent ink.

Figure 2:
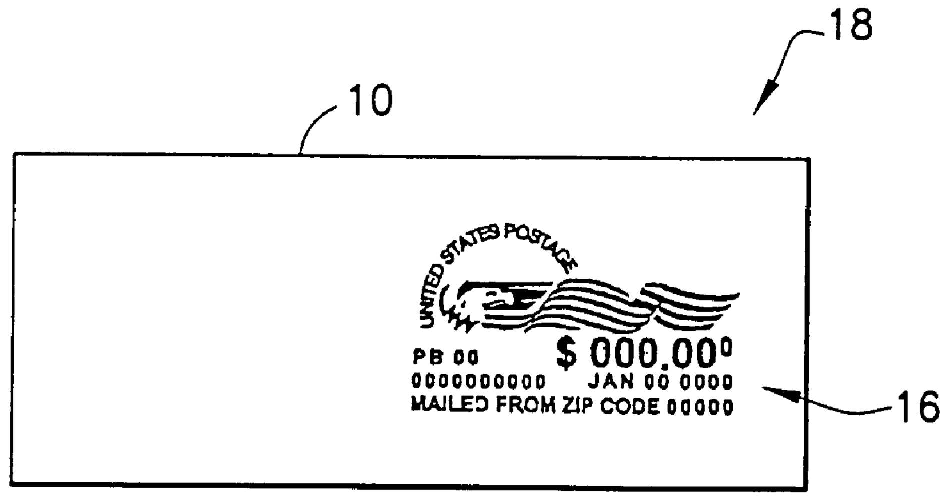
FIG. 2 is a top plan view of a printed label using the blank label shown in FIG. 1.

FIG. 2 shows a top plan view of the label 10 after an indicium 16 has been printed on the label to form a printed label 18. In this embodiment the blank label 10 is a postage meter blank label which is adapted to be inserted into a postage meter and have the indicium 16 printed thereon. However, features of the present invention could be used with other types of blank labels and with other types of printing devices. The indicium 16 comprises postage value data and other information, such as a postage meter identification and ZIP code mailing information. The indicium could comprise any suitable type of information. The printed label 18 can be attached to a mail piece, and the printed indicium 18 can be read by postal service equipment. The signal section 14 can also be read or detected by postal service equipment.

The thermal sensitive layer 22 (FIG. 3) after printing contains different gray scale levels. The gray scale levels other than black still produce fluorescence due to the fluorescent coating. The thermal printing of label 10 affects the fluorescent intensity of the darker shades of the gray scale but has a slight effect on the fluorescent intensity of the lighter shades of the gray scale.

The following chart illustrates that the lighter shades of the gray scale permit the indicium 16 to be read by a United States Postal Service (USPS) facer canceller since the fluorescent intensity is high enough. This allows graphic designs, i.e., indicium 16, to be more flexible in their design due to the added fluorescence of the gray scale. The signal section 14 coating may be Thermokett HR manufactured by AKZO Nobel Inc. with 3.5% Blaze Orange SPL-15N manufactured by Day Glo of Cleveland, Ohio, or WV001025 manufactured by Water Technologies, Inc., plus 3% Blaze Orange SPL-15N manufactured by Day Glo, or Lumilux Red CD 330. The gray scale optional density may be measured using a Model 400 X-Rite, and the ce may be measured with a luminescent meter provided by the USPS.

The following table shows formulations of the coating of signal section 14 with their optical density and fluorescent intensity readings:

FLUORESCENT COATINGS AND DIRECT THERMAL PRINT OF GRAY SCALE

| Thermokett HR + 3.5% Blaze Orange SPL-15N | | | WV 001025 + 3.0% Blaze Orange SPL-15N | | |
|---|---|---|---|---|---|
| Gray Scale Level | Optical Density | PMU Intensity | Gray Scale Level | Optical Density | PMU Intensity |
| 1 | 1.21 | 2.5 | 1 | 1.2 | 3.75 |
| 2 | 1.15 | 2.5 | 2 | 1.15 | 5 |
| 3 | 1.08 | 2.5 | 3 | 1.08 | 3.75 |
| 4 | 0.6 | 2.5 | 4 | 0.6 | 3.75 |
| 5 | 0.49 | 5 | 5 | 0.5 | 6.25 |
| 6 | 0.4 | 6.25 | 6 | 0.41 | 7.5 |
| 7 | 0.31 | 8.75 | 7 | 0.31 | 12.5 |
| 8 | 0.25 | 11.25 | 8 | 0.24 | 15 |
| 9 | 0.19 | 13.75 | 9 | 0.18 | 20 |
| 10 | 0.13 | 22.5 | 10 | 0.12 | 28.75 |

The Direct Thermal Substrate(Mitsubishi K61S-ce) was Coated with Two Fluorescent Varnishes.

Figure 3:
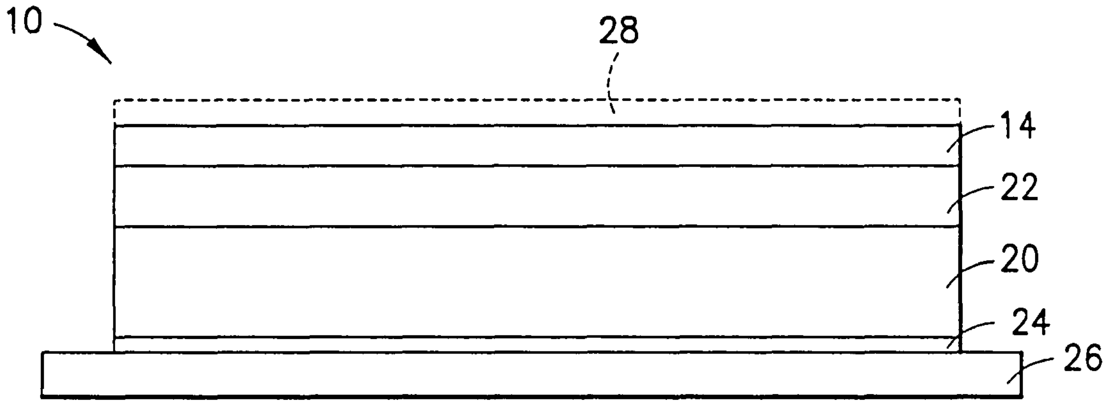
FIG. 3 is a more detailed side view of the blank label shown in FIG. 1.

FIG. 3 is a more detailed side view of the blank label 10. The main section 2 comprises a main substrate 20, a thermally sensitive layer 22 comprising a color former, developer and a binder, the signal section 14, an adhesive layer 24 and a removable paper 26. The label 10 could also comprise a lubricating top coat 28. However, lubricating top coat 28 might not be provided, or the lubricating top coat could be formed with the signal section 14. The blank label 10 is a thermal print label which is adapted to have the indicium 16 printed on the label by a thermal printing device. The label is adapted to be imaged on with any suitable type of thermal printing device, such as a thermal direct printing device, or a thermal mass transfer printing device, or a thermal dye sublimation printing device. In a preferred embodiment, the label is adapted to be imaged on by a thermal direct printing device.

The thermal direct printing device functions by producing an image on the thermal label 10 with an array of thermal heads. The thermally sensitive layer 22 contains a color former and a developer dispersed in a binder. Heat from the thermal head causes localized melting so that the color former and developer are brought into contact. In general the color formers are cationic dyes that become protonized with an acid developer (commonly used are phenols). However, any suitable type of color formers and developers could be used. In addition any suitable type of thermal sensitive layer could be used. In one type of alternative embodiment, the blank label might not comprise a thermally sensitive layer, and might be adapted to be merely printed on by ink. In one type of alternative embodiment, the signal section could be at least partially formed, and perhaps totally formed, with the thermally sensitive layer. As is generally known, after a printed label is formed, the removable paper cover 26 can be removed from the rear of the adhesive layer 24, and the label 18 can be attached to a mail piece.

Figure 4:
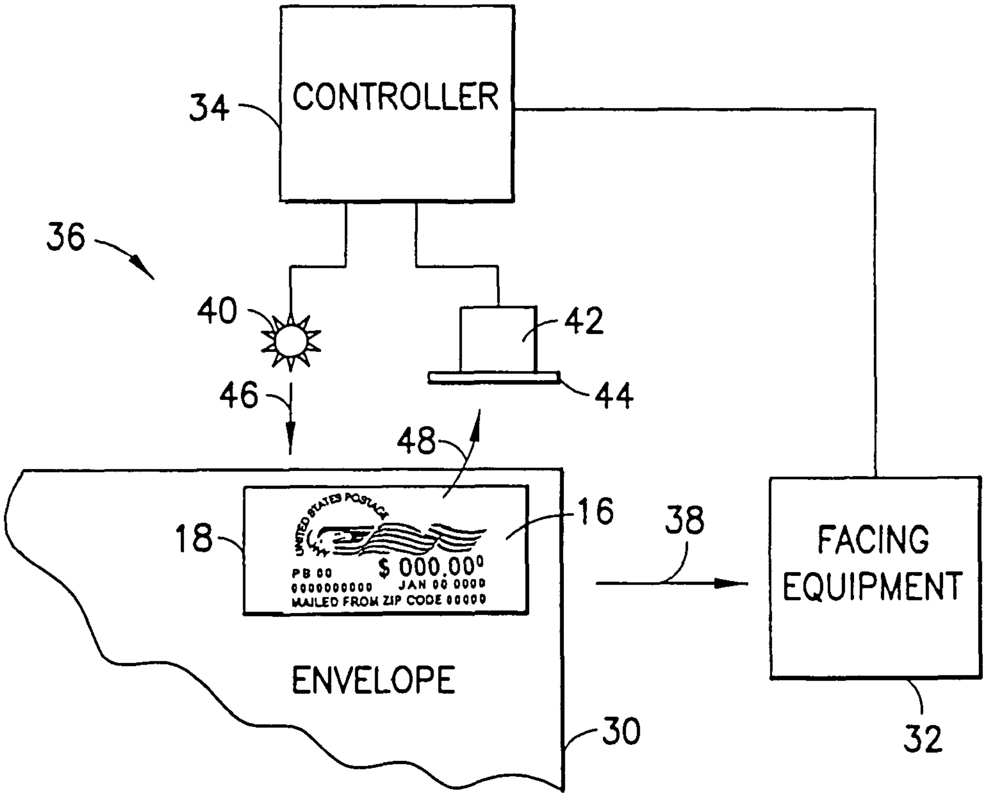
FIG. 4 is diagram showing the printed label of FIG. 2 attached to a mail piece and being processed through postal service equipment.

FIG. 4 shows postal service equipment which process a mail piece 30 having the printed label 18 thereon. The postal service equipment includes facing equipment 32, a controller 34 and a signal section detector 36. The postal service equipment also comprises a value detector (not shown) for detecting the postage value of the indicium 16. The mail piece 30 is moved past the signal section detector 36 as indicated by arrow 38. The facing equipment is adapted to re-orient the mail piece 30 and send it through the signal section detector 36 again (or a second signal section detector (not shown) downstream from the first signal section detector 36) if the first signal section detector 36 does not detect a predetermined signal from the mail piece. Once re-oriented, if the predetermined signal is not detected, the mail piece 30 can be ejected from the system for manual review.

The signal section detector 36 comprises an excitation source 40, an optical sensor 42 and a filter 44. The excitation source is adapted to excite the taggant in the signal section 14. For example, for a fluorescent ink taggant, the excitation source can comprise an ultraviolet LED. The excitation source 40 is adapted to direct excitation radiation 46 towards the signal section 14 on the label 18. The excitation source 40 and type of excitation radiation 46 will be dependent on the color fluorescent ink which is used; generally ranging from ultraviolet to infrared. The reader sensor 42 is adapted to read or detect the fluorescence 48 and send a signal corresponding to the fluorescence or a fluorescent image to another component, such as the controller 34 for processing the scanned fluorescent image. The filter 44 is located in front of the sensor 42 to limit the band of the fluorescence received by the sensor 42. In an alternative embodiment, the filter 44 might not be provided, or the detector 36 could comprise multiple sensors and/or multiple different filters for different wavelength band readings. If the controller 34 does not receive the signal, it can direct the facing equipment to re-orient the mail piece for a further scan to determine if the mail piece 30 is properly faced. The taggant in the signal section does not interfere with reading the postage indicium 16 by the postal service equipment.

Figure 5:
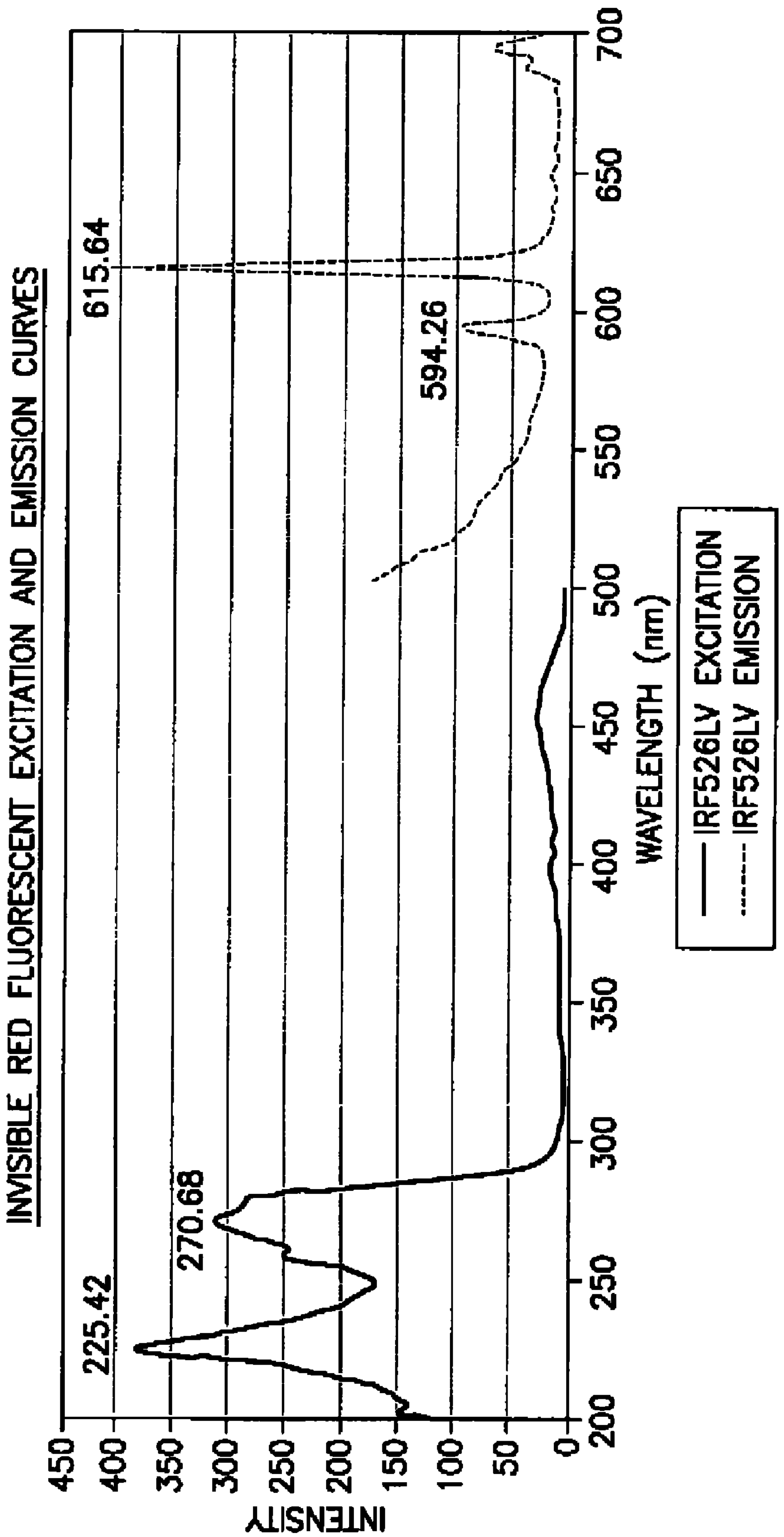
FIG. 5 is a chart showing excitation and emission curves for one type of invisible ink used as a taggent in the signaling section of the blank label.

FIG. 5 shows a chart of invisible red fluorescent excitation and emission curves of intensity versus wavelength for an ink IRF526LV available from Pitney Bowes of Stamford, Conn. As seen, excitation has the greatest intensity at about 225 nm and 270 nm, and emission is highest at about 615 nm. However, in alternative embodiments, any suitable ink with desired excitation and emission properties could be provided. With the use of the IRF526LV invisible red fluorescent ink as the taggant in the signal section, the filter could be a 615 nm filter, and the excitation source could be a 225 nm LED.

The concept consists of coating label media, and in particular, label media to be imaged on with thermal printing devices (thermal direct, thermal mass transfer, and thermal dye sublimation) with fluorescent materials or printing fluorescent images on label media, thermal transfer media thermal direct, pressure sensitive, mass transfer or dye sublimation. These images provide a means for facing the mail in the mail stream and provide a unique signature which can be a narrow band and read by a matching detector (with adequate filters).

The invention can be carried in several ways. One preferred way is to coat on the label media a solvent solution (methanol, acetone, etc.) of a Europium complex (commercially available CD 331 from Honeywell). By excitation with ultraviolet (UV) light a very characteristic emission peak can be emitted at 616 nm (50 nm band width). The fluorescent tagging can be produced also by preprinting (offset, flexographic, digitally) an image with the same taggant and obtain the same characteristic emission as well as a graphic image (for example the Pitney Bowes eagle image) that will be recognized by the facer canceller. Since the color generating process is typically at 70° C. and above, the requirements of the color formers and developers as well as the fluorescent materials is to have the necessary thermal stability at and above this temperature.

Detailed Description of Invention Construction Tested in a Lab:

10% Lumilux CD380 (available from Honeywell) was dissolved in methanol. A 8"×2.5" long strip of Kanzake 1270 thermal media was placed on a KCC101 Control Coater (RK Instruments) with the thermal imaging layer facing up. A drawdown bar with 0.08" wire spacing was installed on the KCC101, and a piece of cellophane tape was placed across the top of the thermal media just below the drawdown bar. The fluorescent solution was applied to the cellophane tape and the Coater machine started by moving the switch to the forward position. The speed of the drawdown was set at the coater's maximum of 15 m/s. This resulted in blank thermal media with an invisible fluorescent coating. A thermal test image was printed on this sample to prove that the coating did not affect the intrinsic working of the thermal media, and that a good black image would result. The printed image, when measured on the PMU meter, had a signal strength of 15 PMU In the actual invention construction, non-flammable solvents or a water gloss heat-resistant overcoat can be used to insure safety and minimize environmental concerns. Examples of an overcoat are WV001025 from Water Ink Technologies, Inc. or THERMOKETT HR™ #TKS 00061 from Akzo Nobel Inks. Alternatively, other printing processes could be used to print proof of payment for postage on label stock carrying a fluorescent signal required for facing including: thermal mass transfer, thermal dye sublimation, ink jet, laser, flexographic, offset or any other.

An alternative way can be to coat or print a visible coating or image with a very diluted red fluorescent dye, toner or pigment. The resulting optical density should be less than about 0.2 and the fluorescent signal in this case can peak in the red region (600nm) but the band width will be higher than 100nm. This solution will be less costly but may be sufficient for facing. The invention can be carried by coating the thermal media with an aqueous solution of common red fluorescent dyes such as Rhodamine 6G, Acid Red 52, dispersion of red fluorescent pigments such as Day Glo, Lumikol, Sinloihi, Radiant, etc.

Figure 6:
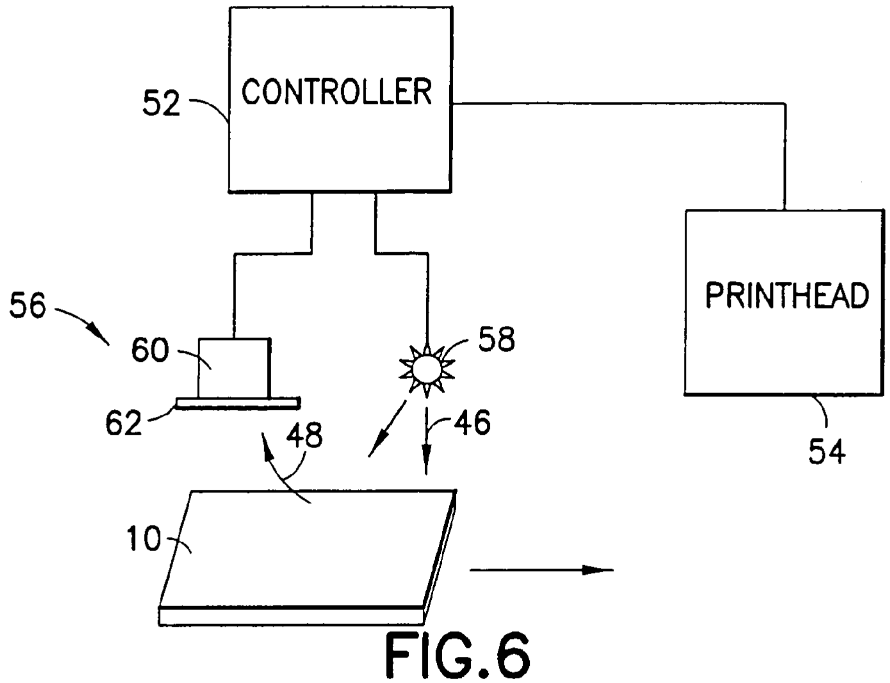
FIG. 6 is a diagram showing components of a postage meter adapted to detect the taggant in the blank label.

The fluorescent material described above can also be used to provide control over the stock to assure that material meeting postal requirements is used. For example, by using inexpensive sensors and filters inside the printer, the printer control system can look for specific reflectance peaks that provide a signature for the blank label media installed. If the media carries this signature, the system will allow printing postage; if it does not contain the required signature, it would not allow printing. This has the advantage of assuring that the media will meet postal requirements for processing. An example of this is shown in FIG. 6.

The postage meter 50 comprises a controller 52, a print head 54, and a detector 56. The detector 56 comprises an excitation source 58, an optical sensor 60 and a filter 62. The excitation source is adapted to excite the taggant in the signal section 14. For example, for a fluorescent ink taggant, the excitation source can comprise an ultraviolet LED. The excitation source 58 is adapted to direct excitation radiation 46 towards the signal section 14 on the blank label 10 before the postage indicium is printed on the blank label by the print head 54. The excitation source 58 and type of excitation radiation 46 will be dependent on the color fluorescent ink which is used in the signal section 14 of the blank label, generally ranging from ultraviolet to infrared. The reader sensor 60 is adapted to read or detect the fluorescence 48 and send a signal corresponding to the fluorescence or a fluorescent image to another component, such as the controller 52 for processing the scanned fluorescent image. The filter 62 is located in front of the sensor 60 to limit the wavelength band of the fluorescence received by the sensor 60. In an alternative embodiment, the filter 62 might not be provided, or the detector 56 could comprise multiple sensors and/or multiple different filters for different wavelength readings. If the controller 52 does not receive the signal, it can direct the print head 54 not to print the postage indicium on the blank label.

Another aspect of this invention is to specifically combine the invisible red fluorescent material into the lubricating top coat 28 (see FIG. 3) of the thermal media. This lubricant is very important to obtain a good head life of one million inches. The abrasion from the thermal paper causes the system to require additional voltage consequently a higher ON/OFF temperatures and system failure. Thus, a combination of the invisible fluorescence and the protective lubricant for the print head may be provided.

The advantage of this invention is that we do not need to print a FIM mark on the stamp and then rely on the customer for its alignment on the envelope. Another advantage is that we do not need to rely on a phosphorescent signal that would cause the image to be canceled. Another advantage is that we are not limited to inks that have particular visible characteristics affecting the appearance of the printed images. Still another advantage is that by preparing the label media with the required signature for processing the image, many different types of imaging materials can be use to create proof of payment images that are creative, and communicate images, messages or information to the recipient.

The invention solves the problem by coating or imbedding in the label media a fluorescent signature. This signature provides a signal that can be used for facing, but does not affect the visual appearance of the image. The appearance of the printed image is no longer affected by the requirement for a FIM, special red fluorescent ink, or a phosphorescent coating which initiates the canceling process.

There is a need to print stamps on thermal direct media, and there is a need for the stamps to be treated as meter indicia in order not to be cancelled, and faced through their fluorescence instead of green phosphorescence. The alternative is to print a FIM mark on the stamp which will have to be aligned correctly on the envelope so that the FIM is at the required position on the envelope, which is inconvenient for the postage meter manufacturer.

Figure 7:
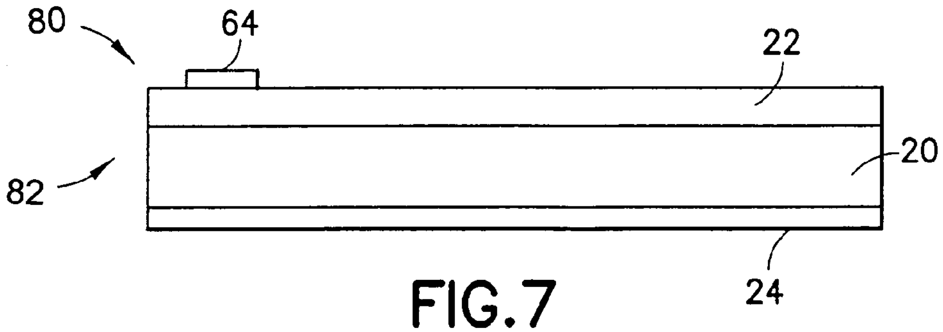
FIG. 7 is a side view of an alternative embodiment of a blank label incorporating features of the present invention.
Figure 8:
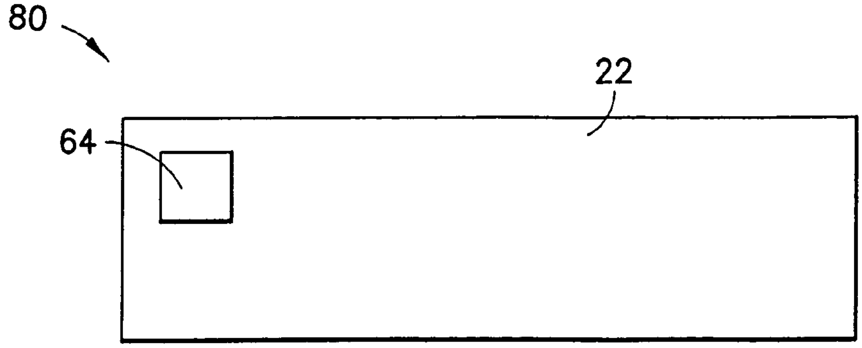
FIG. 8 is a top view of the blank label shown in FIG. 7.

FIG. 7 shows a side view of an alternative embodiment of the blank label. In this embodiment, the blank label 80 comprises a main section 82 and a signal section 64. The main section 62 comprises a main substrate 20, a thermally sensitive layer 22 and an adhesive layer 24. The signal section 64 is located on top of the thermally sensitive layer 22, but does not cover the entire surface of the thermally sensitive layer 22 or the entire top surface of the blank label 60. Instead, as seen also in FIG. 8, the signal section 64 is located on only a portion of the thermally sensitive layer 22. In an alternative embodiment, the signal section 64 might be located on the main substrate adjacent the thermally sensitive layer 22. The signal section 64 could be located in multiple locations, such as around the perimeter of the blank label. These types of embodiments could be used to reduce the amount of taggant (e.g., fluorescent ink) used to form the blank label and, therefore, reduce the manufacturing cost of the blank label.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A label comprising:

a main section having a thermal sensitive layer comprising a color former and developer dispersed in a binder forming a blank label section; and a fluorescent signal section on the blank label section, that is thermally stable at 70° C. and above to allow the formation of an image;

wherein the label is adapted to have an indicium subsequently printed on the blank label section by a printing device, wherein the fluorescent signal section provides a water and moisture protection layer to the fluorescent signal section without the fluorescent signal section substantially interfering with reading of the indicium on the label.

2. A label as in claim 1 further comprising an adhesive backing on a rear side of the main section and a removable paper cover on the adhesive section.

3. A label as in claim 1 wherein the fluorescent signal section comprises a fluorescent ink coating on the main section.

4. A label as in claim 1 wherein the fluorescent signal section comprises a printed image which is printed with fluorescent ink.

5. A label as in claim 1 wherein the fluorescent signal section comprises invisible fluorescent ink.

6. A label as in claim 1 wherein the fluorescent signal section comprises visible fluorescent ink.

7. A label as in claim 1 wherein the fluorescent signal section comprises a luminescent signal adapted to be read by a detector coupled to facing equipment.

8. A label as in claim 1 wherein the label comprises a postage meter blank label which is adapted to be fed through a postage meter and have a postage indicium printed on the label.

9. A label as in claim 1 further comprising a lubricating top coat, wherein the fluorescent signal section is located in the lubricating top coat.

10. A postage label as claimed in claim 1, wherein the fluorescent signal section does not interfere with reading of the postage indicium.

11. The label claimed in claim 1, wherein when heat is supplied to the thermal sensitive layer the color former and developer are brought into contact.

12. A postage meter blank label comprising:

a main section having a thermal sensitive layer comprising a color former and a developer dispersed in a binder adapted to have a postage indicium printed on the main section by a postage meter having a thermal printing device; and a mail facing signal section located on the main section before printing of the indicium on the main section by the printing device, wherein the signal section comprises fluorescent ink that is thermally stable at 70° C. and above, wherein the thermal printing device is adapted to print the indicium by thermal heat transfer to form a printed postage item, and wherein the signal section is adapted to be read by mail facing equipment for facing a mail piece which the printed postage item is attached to.

13. A postage meter blank label as in claim 12 further comprising an adhesive backing on a rear side of the main section and a removable paper cover on the adhesive section.

14. A postage meter blank label as in claim 12 wherein the signal section comprises a fluorescent ink coating on the main section.

15. A postage meter blank label as in claim 12 wherein the fluorescent signal section comprises a printed image which is printed with the fluorescent ink.

16. A postage meter blank label as in claim 12 wherein the fluorescent ink comprises invisible fluorescent ink.

17. A postage meter blank label as in claim 12 wherein the fluorescent ink comprises visible fluorescent ink.

18. A postage meter blank label as in claim 12 further comprising a lubricating top coat, wherein the signal section is located in the lubricating top coat.

19. A postage meter blank label claimed in claim 12, wherein the signal section does not interfere with reading of the postage indicium.

* * * * *